3,660,355
THERMOSET MOLDING POWDERS FROM HYDROXY-FUNCTIONAL ACRYLIC RUBBER PARTICLES AND MONOBLOCKED DIISOCYANATES AND MOLDED ARTICLE
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,459
Int. Cl. C08g 22/00
U.S. Cl. 260—77.5 CR
22 Claims

ABSTRACT OF THE DISCLOSURE

Novel thermosetting resin powders which can be molded to form unique, urethane-crosslinked, elastomer-comprising products are prepared by reacting hydroxy-functional, elastomeric, acrylic polymer particles with a monoblocked diisocyanate. These powders are molded by conventional molding techniques to form unique thermoset products.

---

Self-crosslinking, dry, thermosettable molding powders suitable for rapid curing during processing by conventional molding techniques are prepared by reacting a hydroxy-functional, elastomeric, crosslinked, acrylic polymer particle with a monoblocked diisocyanate. The molded products provide a flexible thermoset having good resistance to abrasion and organic solvents. Among the many uses for which these products have utility are cover sleeves for flexible cables and conduits, specialized flooring materials, flexible housings, etc.

(I) PREPARATION OF THE HYDROXY-FUNCTIONAL ACRYLIC RUBBER PARTICLES

The acrylic rubber particle is a crosslinked, elastomeric acrylic polymer having hydroxy functionality. These particles can be prepared in either an aqueous or organic medium.

In one method of preparation, a major amount of monoacrylate is emulsion copolymerized with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter.

The monoacrylate component of the monomer mixture comprises about 80 to about 98 mole percent of the mixture while the balance, the di- or tri-functional component, constitutes about 2 to about 20 mole percent. The monoacrylate component contains about 65 to about 98, preferably about 70 to about 95, mole percent of a monofunctional, alkyl monoacrylate and about 2 to about 35, preferably about 5 to about 30, mole percent of a hydroxyalkyl acrylate. The monofunctional, alkyl acrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when a crosslinked polymer thereof has an appropriate glass transition temperature, e.g. dodecyl acrylate. Butyl acrylate and 2-ethyl hexyl acrylate are the most preferred of the monofunctional monoacrylates for use in forming this rubber. The hydroxyalkyl acrylate is preferably the ester of either acrylic or methacrylic acid and a $C_2$–$C_3$ diol, e.g., hydroxyethyl acrylate, hydroxyethyl methacrylate, hydroxypropyl acrylate, hydroxypropyl methacrylate, or mixtures of the same. The glass transition temperature of the crosslinked polymer should be such that the particle retains its rubber-like properties at temperatures to which the thermoset polymeric product would normally be exposed.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate and diallyl phthalate. In one embodiment, the crosslinking agent is a diester of acrylic or methacrylic acid and a $C_2$–$C_6$, dihydric alcohol. In another embodiment, the crosslinking agent is a triester of acrylic or methacrylic acid and a $C_2$–$C_8$, preferably a $C_2$–$C_6$, trihydric alcohol.

The polymerization process is continued to yield a stable latex of relatively uniform particle size and composition. The latex is coagulated, washed, and dried to yield finely divided powder suitable for use in this invention.

The monomer charge is emulsified by one or more micelle-forming compounds composed of a hydrophobic part, such as a hydrocarbon group containing 8 or more carbon atoms, and a hydrophilic part, such as alkaline metal or ammonium hydroxide groups, phosphate or sulfate partial ester groups, sulfonate groups, and the like. Exemplary emulsifying agents include alkali metal sulfonates of styrene, naphthalene, decyl benzene dodecyl benzene; sodium dodecyl sulfate; sodium stearate; sodium oleate; the sodium alkyl acyl sulfonates; polyoxymethylene sulfates and phosphates; the ethylene oxide condensates with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unnecessary.

A polymerization initiator is composed of one or more water-soluble, free-radical-generating species such as hydrogen peroxide or sodium, potassium, or ammonium persulfates, perborates, peracetates, percarbonates and the like.

As is well know in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the crosslinked acrylic polymers. Such chain transfer agents are generally mercaptans such as dodecanethiol, benzenethiol, pentanethiol and butanethiol. Those skilled in the art will be aware that other emulsifying agents, polymerization initiators and chain transfer agents may be used when compatible with the polymerization system herein employed. The reaction may be carried out at temperatures from about 40° C. to about 80° C., or at lower temperatures, as from about 0° C. to 80° C. in the case of activated systems.

In another method of preparation, the rubber particles are formed in an aliphatic hydrocarbon medium.

(II) PREPARATION OF THE MONOBLOCKED DIISOCYANATE

The diisocyanates employed herein are monoblocked to allow for separate stage reactions and thereby avoid crosslinking until the shape of the desired molding has been established.

Suitable diisocyanates for this purpose include, but not by way of limitation, toluene diisocyanate, 4,4'-diphenylmethane diisocyanate, 1-phenoxy-2,4-phenylene diisocyanate, 1-tert-butyl-2,4-phenylene diisocyanate, and 1-ethyl-2,4-phenylene diisocyanate.

The preferred blocking agent is caprolactam. Other blocking agents such as phenols and tertiary butyl alcohol may also be used. The blocking agents are selected so that the blocked isocyanate group is converted to free isocyanate group in a temperature range of about 120° to about 170° C. Sometimes a catalyst such as triethylene diamine or stannous octoate may be advantageously used in 0.05 to 1 percent concentration (basis weight of reactants) to assist the deblocking process.

A diisocyanate can be monoblocked with caprolactam by intimately dispersing the two in toluene, preferably at a slightly elevated temperature.

When the first isocyanate group is blocked, the monoblocked product precipitates out of solution. See, Raymond R. Myers & J. S. Long, Film-Forming Compositions, vol. 1, Part I, page 485, published by Marcel Dekker Inc., New York, U.S.A. (1961).

(III) PREPARATION OF THE MOLDABLE REACTION PRODUCT

The unblocked isocyanate group of the monoblocked diisocyanate is reacted with a hydroxyl group on the surface of a particle of the hydroxy-functional, elastomer in an organic solvent. The solvent preferably contains a suitable catalyst and is mildly heated to facilitate reaction. The reaction product is recovered as a dry foam. This foam is powdered and further dried. It is then ready for molding.

(IV) PREPARATION OF THE MOLDED PRODUCT

The product formed by reacting the unblocked isocyanate group of the monoblocked diisocyanate with the hydroxy-functional, elastomeric particles can be molded and crosslinked by conventional molding techniques. The temperature of the molding powder is raised to a temperature which will result in the unblocking of the other isocyanate group. The thermoset then crosslinks when this group reacts with a hydroxy group on the surface of the rubber-like particles.

This powder may comprise the sole component of the molding powder or it may be admixed with other hydroxy-functional powder, e.g. the hydroxy-functional, elastomeric particles which have not been pre-reacted with diisocyanate.

This invention will be more fully understood from the following illustrative examples:

Example 1

Rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about 1/9 of a monomer mixture consisting of 521 parts by weight butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of this monomer mixture is begun at a rate such that the temperature of the reaction mixture is maintained at 47° to 50° C. During the addition of the last two thirds of the monomer mixture, 5.72 parts by weight sodium dodecyl sulfate dissolved in 35.7 parts by weight water and 65 parts by weight hydroxyethyl methacrylate are added at a substantially constant rate. The reaction mixture is maintained at 47° to 50° C. for about 2 hours.

The emulsion is then coagulated by addition of about 20 grams of concentrated hydrochloric acid solution and 100 ml. of water. The rubber particles are isolated by filtration and washed with methanol containing 1 weight percent of hydrochloric acid. The particles are then dried.

One hundred parts by weight of the above particles are dispersed in 800 parts by weight of acetone and to it are added 14 parts by weight of monocaprolactam blocked diphenyl methane diisocyanate of the following structure:

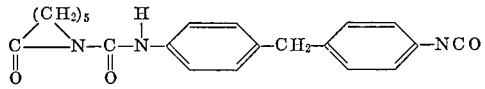

Stannous octoate in the amount of 0.2 part by weight and 0.04 part by weight triethylenediamine are added and the mixture is heated at 60° C. for 4 hours. The acetone is removed under vacuum to obtain a dry foam. The foam is then powdered and further dried under vacuum for 4 hours at 70° C.

The powder thus obtained is compression molded at 175° C. for 10 minutes. A yellowish colored sheet is obtained which is tough and insoluble in acetone.

The monocaprolactam blocked diphenylmethane diisocyanate is prepared by the following procedure: 300 parts by weight of 4,4'-diphenylmethane diisocyanate and 113 parts by weight caprolactam are added to 1600 parts by weight toluene and the mixture is maintained at 80° C. for 8 hours. After cooling to room temperature, the precipitate obtained is filtered and dried under vacuum.

Example 2

About 1000 parts by weight water is boiled for 10 minutes and then cooled to room temperature under nitrogen. Sodium dodecyl sulfate in the amount of 2.9 parts by weight dissolved in 36 parts by weight water is added. To this solution is added 1/10 of a mixture of 500 parts by weight ethyl acrylate and 50 parts by weight triethylene glycol dimethacrylate. The mixture is stirred to establish an emulsion.

To this emulsion is then added 3.2 parts by weight potassium persulfate dissolved in 71 parts by weight of water and the mixture is heated to 45° C. Temperature begins to rise in about 10 minutes. The temperature is maintained between 47° and 52° C. by simultaneous cooling during slow addition of the remaining 9/10 of the monomer mixture. During the last 2/3 of the addition of this fraction of the monomer mixture there is added at a constant rate 6 parts by weight of sodium dodecyl sulfate dissolved in 36 parts by weight water. During the last 1/3 of the addition of this fraction of the monomer mixture there is added with the monomer mixture about 65 parts by weight hydroxyethyl methacrylate and 10 parts by weight pentane thiol. The reaction mixture is maintained at 47° to 52° C. for one hour after the monomer addition is complete.

The emulsion obtained above is coagulated by adding 20 grams of concentrated hydrochloric acid in 200 ml. of water. The cake obtained is filtered and washed with methanol containing 1 weight percent of hydrochloric acid. The cake is then washed twice with anhydrous ethanol and dried under vacuum. This is designated as material A.

Determination of the concentration of reactive hydroxyl groups on the surfaces of the particles is made by the well known method of analysis wherein the hydroxyl groups are reacted with acetic anhydride using a pyridine catalyst. The acetic acid is back titrated with sodium hydroxide. For details, reference is made to C. A. Steyermark, Quantitative Organic Analysis, pp. 302–303 published by Blakiston Company, New York, Toronto, and Philadelphia (1951).

In 800 parts by weight of methyl ethyl ketone are dispersed 100 parts by weight of A and 15 parts by weight of monocaprolactam blocked diphenylmethane diisocyanate. To this dispersion is added 0.4 part by weight triethylenediamine and 0.2 part by weight stannous octoate and the mixture is heated at 70° C. for 4 hours.

The solvent is removed under vacuum to obtain a powder containing less than 2 percent solvent. This powder is hereinafter referred to as material B. This powder is compression molded at 170° C. for 15 minutes to obtain a urethane-crosslinked, rubber-comprising thermoset sheet.

Example 3

One hundred (100) parts by weight of material A is reacted with 30 parts by weight of monocaprolactam blocked diphenyl methane diisocyanate in methyl ethyl ketone. After removing the solvent under vacuum, the powder material C, is mixed with 10 parts by weight of ethylene glycol and compression molded at 175° C. for 15 minutes.

Example 4

One hundred (100) parts by weight of material A is mixed with 30 parts by weight of monocaprolactam blocked diphenyl methane diisocyanate and 10 grams of ethylene glycol and extruded through a mixing extruder at 135° C. The extrudate is chopped to pellets which on compression molding at 375° F. yield a slightly yellowish colored crosslinked sheet resistant to organic solvents.

Example 5

The procedure of Example 2 is repeated except that material A is prepared from the following constituent monomers:

| Monomers: | Parts by wt. |
|---|---|
| Butyl acrylate | 520 |
| 1,3-butylene dimethacrylate | 80 |
| Hydroxypropyl methacrylate | 71 |

The butyl acrylate and the 1,3-butylene dimethacrylate are mixed and divided into three equal portions which are sequentially added in slow dropwise fashion. The hydroxypropyl methacrylate is mixed into and added with the last one-third fraction. One hundred (100) parts by weight of this material is reacted with 30 parts by weight of caprolactam monoblocked diphenyl methane diisocyanate.

Example 6

The procedure of Example 2 is repeated except that material A is prepared from the following constituent monomers:

| Monomers: | Parts by wt. |
|---|---|
| 2-ethyl hexyl acrylate | 520 |
| Triethylene glycol dimethacrylate | 100 |
| Hydroxyethyl acrylate | 58 |

The 2-ethyl hexyl acrylate and the triethylene glycol dimethacrylate are mixed and divided into three equal portions which are sequentially added in slow dropwise fashion. The hydroxyethyl acrylate is mixed into and added with the last one third fraction. One hundred (100) parts by weight of this material is reacted with 30 parts by weight of caprolactam monoblocked diphenyl methane diisocyanate.

Example 7

The procedures of Examples 1 and 3 are repeated with the difference that the monoblocked diisocyanate is monoblocked toluene diisocyanate.

Example 8

The procedures of Examples 1 and 3 are repeated with the difference that the monoblocked diisocyanate is monoblocked 1-phenoxy-2,4-phenylene diisocyanate.

Example 9

The procedures of Examples 1 and 3 are repeated with the difference that the monoblocked diisocyanate is monoblocked 1-tert-butyl-2,4-phenylene diisocyanate.

Example 10

The procedures of Examples 1 and 3 are repeated with the difference that the monoblocked diisocyanate is monoblocked 1-ethyl-2,4-phenylene diisocyanate.

Example 11

The procedure of Example 1 is repeated with the difference that an equimolar amount of ethyl acrylate is substituted for the butyl acrylate used to form the hydroxy-functional rubber particle.

Example 12

The procedure of Example 1 is repeated with the difference that an equimolar amount of cyclohexyl acylate is substituted for the butyl acrylate and an equimolar amount of 1,3-butylene diacrylate is substituted for the 1,3-butylene dimethacrylate used to form the hydroxy-functional rubber particle.

Example 13

The procedure of Example 1 is repeated with the difference that an equimolar amount of 1,6-hexamethylene diacrylate is substituted for the 1,3-butylene dimethacrylate used to form the hydroxy-functional rubber particle.

Example 14

The procedure of Example 1 is repeated with the differences that an equimolar amount of divinyl benzene is substituted for the 1,3-butylene dimethacrylate and an equimolar amount of hydroxypropyl acrylate is substituted for the hydroxyethyl methacrylate used to form the hydroxy-functional rubber particle.

Example 15

The procedure of Example 1 is repeated with the difference that a functionally equivalent amount of 1,1,1-trimethylolpropane trimethacrylate is substituted for the 1,3-butylene dimethacrylate in the formation of the core of the hydroxy-functional rubber particle.

Example 16

The procedure of Example 1 is repeated with the difference that a functionally equivalent amount of 1,1,1-trimethylolethane triacrylate is substituted for the 1,3-butylene dimethacrylate in the formation of the core of the hydroxy-functional rubber particle.

Example 17

The procedure of Example 1 is repeated with the difference that a functionally equivalent amount of 1,4-dimethylolcyclohexane dimethacrylate is substituted for the 1,3-butylene dimethacrylate in the formation of the core of the hydroxy-functional rubber particle.

Example 18

The procedures of Example 1 are repeated with the difference that the concentration of hydroxyalkyl acrylate in the hydroxy-functional rubber particle is about 2 mole percent.

Example 19

The procedures of Example 1 are repeated with the difference that the concentration of hydroxyalkyl acrylate in the hydroxy-functional rubber particle is about 5 mole percent.

Example 20

The procedures of Example 1 are repeated with the difference that the concentration of hydroxyalkyl acrylate in the hydroxy-functional rubber particle is about 30 mole percent.

Example 21

The procedures of Example 1 are repeated with the difference that the concentration of hydroxyalkyl acrylate in the hydroxy-functional rubber particle is about 35 mole percent.

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the appended claims. Those skilled in the art will be aware that modifications may be made therein without departing from the scope of the invention as set forth in the appended claims.

We claim:

1. A molding powder formed by reacting a first and unblocked isocyanate group of a monoblocked organic diisocyanate with a particle of hydroxy-functional, elastomeric, crosslinked, acrylic polymer consisting essentially of
   (1) about 80 to about 98 mole percent of a monoacrylate component which consists essentially of about 65 to about 98 mole percent of an alkyl ester of acrylic acid and about 2 to about 35 mole percent of a hydroxyalkyl ester of acrylic or methacrylic acid, and
   (2) about 2 to about 20 mole percent of divinyl benzene, a diester of acrylic or methacrylic acid and a $C_2$–$C_8$ dihydric alcohol or a triester of acrylic acid or methacrylic acid and a $C_2$–$C_8$ trihydric alcohol, the second and blocked isocyanate group of this diisocyanate being rendered inactive by a blocking agent that releases from said diisocyanate at a temperature in the range of about 120° to about 170° C. leaving said second isocyanate group free to react as an isocyanate group when said molding powder is molded at temperatures above about 120° C.

2. A molding powder formed by reacting a first and unblocked isocyanate group of a monoblocked organic diisocyanate with a particle of hydroxy-functional, elastomeric, crosslinked acrylic polymer consisting essentially of
   (1) about 80 to about 98 mole percent of a monoacrylate component which consists essentially of about 68 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, and
   (2) about 2 to about 20 mole percent of divinyl benzene, a diester of acrylic or methacrylic acid and a $C_2$–$C_8$ dihydric alcohol or a triester of acrylic acid or methacrylic acid and a $C_2$–$C_8$ trihydric alcohol, the second and blocked isocyanate group of said diisocyanate being rendered inactive by a blocking agent that releases from said diisocyanate at a temperature in the range of about 120° to about 170° C. leaving said second isocyanate group free to react as an isocyanate group when said molding powder is molded at temperatures above about 120° C.

3. A molding powder in accordance with claim 2 wherein said monoacrylate component consists essentially of about 70 to about 95 mole percent of a monoester of acrylic acid and a $C_2$–$C_8$ monohydric alcohol and about 5 to about 30 mole percent of a hydroxy-functional acrylate selected from hydroxyethyl acrylate, hydroxyethyl methacrylate, hydroxypropyl acrylate and hydroxypropyl methacrylate.

4. A molding powder in accordance with claim 2 wherein said particle of hydroxy-functional, elastomeric, crosslinked, acrylic polymer has average diameter in the range of about 0.04 to about 1 micron.

5. A molding powder in accordance with claim 2 wherein said monoacrylate of said crosslinked acrylic polymer consists essentially of butyl acrylate, 1,3-butylene diacrylate or dimethacrylate, and said hydroxy-functional acrylate.

6. A molding powder in accordance with claim 2 wherein said monoacrylate of said crosslinked acrylic polymer consists essentially of 2-ethyl hexyl acrylate, 1,3-butylene diacrylate or dimethacrylate, and said hydroxy-functional acrylate.

7. A molding powder in accordance with claim 2 wherein said organic diisocyanate is toluene diisocyanate.

8. A molding powder in accordance with claim 2 wherein said organic diisocyanate is 4,4'-diphenylmethane diisocyanate.

9. A molding powder in accordance with claim 2 wherein said organic diisocyanate is 1-tert-butyl-2,4-phenylene diisocyanate.

10. A molding powder in accordance with claim 2 wherein said organic diisocyanate is 1-ethyl-2,4-phenylene diisocyanate.

11. A molding powder in accordance with claim 2 wherein said blocking agent is caprolactam.

12. A molded thermoset product formed by (A) reacting a first and unblocked isocyanate group of a monoblocked organic diisocyanate with a particle of hydroxy-functional, elastomeric, crosslinked, acrylic polymer consisting essentially of
   (1) about 80 to about 98 mole percent of a monoacrylate component which consists essentially of about 65 to about 98 mole percent of an alkyl ester of acrylic acid and about 2 to about 35 mole percent of a hydroxyalkyl ester of acrylic or methacrylic acid, and
   (2) about 2 to about 20 mole percent of divinyl benzene, a diester of acrylic or methacrylic acid and a $C_2$–$C_8$ dihydric alcohol or a triester of acrylic acid or methacrylic acid and a $C_2$–$C_8$ trihydric alcohol, the second and blocked isocyanate group of this diisocyanate being rendered inactive by a blocking agent that releases from said diisocyanate at a temperature in the range of about 120° to about 170° C. leaving said second isocyanate group free to react as an isocyanate group when said molding powder is molded at temperatures above about 120° C., and (B) crosslinking said powder by molding the same at a temperature above about 120° C.

13. A molded thermoset product formed by (A) reacting a first and unblocked isocyanate group of a monoblocked organic diisocyanate with a particle of hydroxy-functional, elastomeric, crosslinked, acrylic polymer consisting essentially of
   (1) about 80 to about 98 mole percent of a monoacrylate component which consists essentially of about 68 to about 98 mole percent of a monoester of acrylic acid and a $C_2$–$C_8$ monohydric alcohol and about 2 to about 35 mole percent of a hydroxy-functional acrylate selected from hydroxyethyl acrylate, hydroxyethyl methacryate, hydroxypropyl acrylate and hydroxypropyl methacrylate, and
   (2) about 2 to about 20 mole percent of divinyl benzene, a diester of acrylic or methacrylic acid and a $C_2$–$C_8$ dihydric alcohol or a triester of acrylic acid or methacrylic acid and a $C_2$–$C_8$ trihydric alcohol,
the second and blocked isocyanate group of said diisocyanate being rendered inactive by a blocking agent that releases from said diisocyanate at a temperature in the range of about 120° to about 170° C. leaving said second isocyanate group free to react as an isocyanate group when said molding powder is molded at temperatures above about 120° C., and (B) crosslinking said powder by molding the same at a temperature above about 120° C.

14. A molded thermoset in accordance with claim 13 wherein said monoacrylate component consists essentially of about 70 to about 95 mole percent of a monoester of acrylic acid and a $C_2$–$C_8$ monohydric alcohol and about 5 to about 30 mole percent of a hydroxy-functional acrylate selected from hydroxyethyl acrylate, hydroxyethyl methacrylate, hydroxypropyl acrylate and hydroxypropyl methacrylate.

15. A molded thermoset product in accordance with claim 13 wherein said particle of hydroxy-functional, elastomeric, crosslinked, acrylic polymer has average diameter in the range of about 0.05 to about 0.2 micron.

16. A molded thermoset product in accordance with claim 13 wherein said crosslinked acrylic polymer consists essentially of butyl acrylate, 1,3-butylene diacrylate or dimethacrylate, and said hydroxy-functional acrylate.

17. A molded thermoset product in accordance with claim 13 wherein said crosslinked acrylic polymer consists essentially of 2-ethyl hexyl acrylate, 1,3-butylene diacrylate or dimethacrylate, and said hydroxy-functional acrylate.

18. A molded thermoset product in accordance with claim 13 wherein said organic diisocyanate is toluene diisocyanate.

19. A molded thermoset product in accordance with claim 13 wherein said organic diisocyanate is 4,4'-diphenylmethane diisocyanate.

20. A molded thermoset product in accordance with claim 13 wherein said organic diisocyanate is 1-tert-butyl-2,4-phenylene diisocyanate.

21. A molded thermoset product in accordance with claim 13 wherein said organic diisocyanate is 1-ethyl-2,4-phenylene diisocyanate.

22. A molded thermoset product in accordance with claim 13 wherein said blocking agent is caprolactam.

References Cited
UNITED STATES PATENTS

| | | | |
|---|---|---|---|
| 3,423,481 | 1/1969 | Mizutani | 260—836 |
| 3,437,514 | 4/1969 | Burlant | 260—872 |
| 3,450,796 | 6/1969 | Griffin | 260—885 |
| 3,502,745 | 3/1970 | Minton | 260—881 |
| 3,509,234 | 4/1970 | Burlant | 260—859 |
| 3,528,844 | 9/1970 | Burlant | 260—885 |

PAUL LIEBERMAN, Primary Examiner

U.S. Cl. X.R.

260—29.7 H, 77.5 TB, 80.75, 80.81, 859